(12) United States Patent
Raghavendra et al.

(10) Patent No.: US 8,528,385 B2
(45) Date of Patent: Sep. 10, 2013

(54) LEAK DETECTION SYSTEM

(75) Inventors: Srinivasan Raghavendra, Bangalore (IN); Avamthsa Sreeram, Visakhapatnam (IN); Abhishek Muglikar, Pune (IN)

(73) Assignee: Eaton Corporation, Cleveland, OH (US)

( * ) Notice: Subject to any disclaimer, the term of this patent is extended or adjusted under 35 U.S.C. 154(b) by 359 days.

(21) Appl. No.: 12/981,590

(22) Filed: Dec. 30, 2010

(65) Prior Publication Data

US 2012/0167669 A1 Jul. 5, 2012

(51) Int. Cl.
*G01M 3/28* (2006.01)
(52) U.S. Cl.
USPC ........................................................ 73/40.5 R
(58) Field of Classification Search
USPC ................. 73/40, 40.5 R, 46, 49.5; 250/573; 356/73.1, 436
See application file for complete search history.

(56) References Cited

U.S. PATENT DOCUMENTS

| | | |
|---|---|---|
| 3,911,959 A | 10/1975 | Frank |
| 4,270,049 A | 5/1981 | Tanaka et al. |
| 4,386,269 A | 5/1983 | Murphy |
| 4,446,892 A | 5/1984 | Maxwell |
| 4,590,462 A | 5/1986 | Moorehead |
| 4,596,442 A | 6/1986 | Anderson et al. |
| 4,710,353 A | 12/1987 | Tanaka et al. |
| 4,729,106 A | 3/1988 | Rush et al. |
| 4,749,855 A | 6/1988 | Watanabe |
| 4,824,206 A | 4/1989 | Klainer et al. |
| 4,882,499 A | 11/1989 | Luukkala et al. |
| 4,897,551 A | 1/1990 | Gersh et al. |
| 4,942,306 A | 7/1990 | Colbourne |
| 4,976,157 A | 12/1990 | Berthold et al. |
| 4,988,155 A | 1/1991 | Harner et al. |
| 5,090,871 A | 2/1992 | Story et al. |
| 5,121,644 A | 6/1992 | Grey et al. |
| 5,187,366 A | 2/1993 | Hopenfeld |
| 5,222,769 A | 6/1993 | Kaempen |
| 5,343,191 A | 8/1994 | McAtamney |
| 5,362,971 A | 11/1994 | McMahon et al. |
| 5,378,889 A | 1/1995 | Lawrence |
| 5,452,076 A | 9/1995 | Schopper et al. |

(Continued)

FOREIGN PATENT DOCUMENTS

| | | |
|---|---|---|
| BE | 897768 | 1/1984 |
| CN | 1414283 | 4/2003 |

(Continued)

OTHER PUBLICATIONS

Written Opinion and International Search Report in corresponding PCT Application No. PCT/IB2011/003180 filed Dec. 30, 2011; Authorized Officer Daman, Marcel; Dated Mar. 27, 2012 (9 pages).

*Primary Examiner* — Hezron E Williams
*Assistant Examiner* — David Z Huang
(74) *Attorney, Agent, or Firm* — Benesch Friedlander Coplan & Aronoff LLP

(57) ABSTRACT

A hose leakage detection system includes a ring configured to be disposed within a hose. The ring has a lateral slot formed in an outer surface, defining a first slot wall and a second slot wall. A sensor is disposed on one of the first slot wall and the second slot wall and a power source is electrically connected to the leakage detection system.

10 Claims, 2 Drawing Sheets

(56) References Cited

U.S. PATENT DOCUMENTS

| | | |
|---|---|---|
| 5,452,082 A | 9/1995 | Sanger et al. |
| 5,638,174 A | 6/1997 | Henderson |
| 5,663,490 A | 9/1997 | Kozen |
| 5,714,681 A | 2/1998 | Furness et al. |
| 5,722,702 A | 3/1998 | Washburn |
| 5,727,100 A | 3/1998 | Grajewski et al. |
| 5,966,477 A | 10/1999 | Johnson |
| 5,969,618 A | 10/1999 | Redmond |
| 5,984,262 A | 11/1999 | Parsons et al. |
| 6,004,070 A | 12/1999 | Van Camp |
| 6,005,242 A | 12/1999 | Chernyak |
| 6,158,784 A | 12/2000 | Lavender |
| 6,426,796 B1 | 7/2002 | Pulliam et al. |
| 6,547,435 B1 | 4/2003 | Grosswig et al. |
| 6,554,320 B2 | 4/2003 | Cresswell |
| 6,586,723 B2 | 7/2003 | Moran et al. |
| 6,592,126 B2 | 7/2003 | Davis |
| 6,618,153 B2 | 9/2003 | Lin et al. |
| 6,622,561 B2 | 9/2003 | Lam et al. |
| 6,695,593 B1 | 2/2004 | Steck et al. |
| 6,717,658 B1 | 4/2004 | Saini et al. |
| 6,753,520 B2 | 6/2004 | Spirin et al. |
| 6,785,004 B2 | 8/2004 | Kersey et al. |
| 6,787,758 B2 | 9/2004 | Tubel et al. |
| 6,922,241 B2 | 7/2005 | Kramer |
| 7,009,707 B2 | 3/2006 | Beresford et al. |
| 7,045,767 B2 | 5/2006 | Peng et al. |
| 7,117,751 B2 | 10/2006 | Berger et al. |
| 7,229,403 B2 | 6/2007 | Schock et al. |
| 7,316,154 B1 | 1/2008 | Bennett |
| 7,387,012 B2 | 6/2008 | Spaolonzi et al. |
| 7,397,976 B2 | 7/2008 | Mendez et al. |
| 7,398,697 B2 | 7/2008 | Allen et al. |
| 7,453,367 B2 | 11/2008 | Spaolonzi et al. |
| 7,458,273 B2 | 12/2008 | Skinner et al. |
| 7,466,399 B2 | 12/2008 | Melnyk |
| 7,509,841 B2 | 3/2009 | Spaolonzi et al. |
| 7,542,142 B2 | 6/2009 | Wu et al. |
| 7,590,496 B2 | 9/2009 | Blemel |
| 7,706,640 B2 | 4/2010 | Pizzorno et al. |
| 7,729,567 B2 | 6/2010 | Ling et al. |
| 7,751,676 B2 | 7/2010 | Riley et al. |
| 7,792,392 B2 | 9/2010 | Chen et al. |
| 7,835,599 B2 | 11/2010 | Beaulieu et al. |
| 7,894,061 B2 | 2/2011 | MacDougall et al. |
| 7,900,699 B2 | 3/2011 | Ramos et al. |
| 7,926,360 B2 | 4/2011 | Unalmis et al. |
| 7,940,389 B2 | 5/2011 | Rogers et al. |
| 7,942,452 B2 | 5/2011 | Carns et al. |
| 2002/0149773 A1 | 10/2002 | Martino et al. |
| 2003/0010941 A1* | 1/2003 | Spolaczyk et al. ............ 250/573 |
| 2004/0047536 A1 | 3/2004 | Pickrell et al. |
| 2004/0154380 A1 | 8/2004 | Walker |
| 2004/0177891 A1 | 9/2004 | Spaolonzi et al. |
| 2004/0207201 A1 | 10/2004 | Starita |
| 2005/0024215 A1 | 2/2005 | Roy |
| 2005/0036140 A1 | 2/2005 | Elster et al. |
| 2005/0082467 A1 | 4/2005 | Mossman |
| 2006/0225507 A1 | 10/2006 | Paulson |
| 2007/0009007 A1 | 1/2007 | Nicholls et al. |
| 2007/0145743 A1 | 6/2007 | Greenberger et al. |
| 2008/0002186 A1* | 1/2008 | Masterson et al. ........... 356/73.1 |
| 2008/0137711 A1 | 6/2008 | Gleitman |
| 2009/0173494 A1 | 7/2009 | Tarvin et al. |
| 2009/0220190 A1 | 9/2009 | Zandiyeh et al. |
| 2009/0277248 A1 | 11/2009 | Skibin et al. |
| 2009/0306911 A1 | 12/2009 | Gysling |
| 2010/0005860 A1* | 1/2010 | Coudray et al. ........... 73/40.5 R |
| 2010/0175460 A1 | 7/2010 | Artieres et al. |
| 2010/0229662 A1 | 9/2010 | Brower |
| 2010/0269941 A1 | 10/2010 | Hara |
| 2010/0288018 A1 | 11/2010 | Hopmann |
| 2010/0315630 A1 | 12/2010 | Ramos et al. |
| 2011/0005303 A1 | 1/2011 | Izumo et al. |
| 2011/0017337 A1 | 1/2011 | Kagoura |
| 2011/0019177 A1 | 1/2011 | De Chizelle et al. |
| 2011/0026031 A1 | 2/2011 | Kristiansen et al. |
| 2011/0093220 A1 | 4/2011 | Yang et al. |
| 2011/0100112 A1 | 5/2011 | Du |
| 2011/0102790 A1 | 5/2011 | Haught et al. |
| 2011/0109912 A1 | 5/2011 | Spross et al. |
| 2011/0116098 A1 | 5/2011 | Spross et al. |

FOREIGN PATENT DOCUMENTS

| | | |
|---|---|---|
| CN | 1598516 | 3/2005 |
| CN | 2898800 | 5/2007 |
| CN | 2898815 | 5/2007 |
| CN | 2935102 | 8/2007 |
| CN | 200958686 | 10/2007 |
| CN | 101706039 | 5/2010 |
| CN | 101738693 | 6/2010 |
| CN | 101825563 | 9/2010 |
| CN | 101858488 | 10/2010 |
| DE | 19532967 | 3/1997 |
| DE | 19621797 | 12/1997 |
| DE | 10215064 | 11/2002 |
| DE | 10307833 | 10/2004 |
| EP | 0146826 | 11/1984 |
| EP | 0453226 | 4/1991 |
| EP | 0505581 | 10/1991 |
| EP | 0697587 | 2/1996 |
| EP | 2065551 | 6/2009 |
| GB | 2100420 | 12/1982 |
| GB | 2280870 | 2/1995 |
| GB | 2393781 | 4/2004 |
| GB | 2408329 | 5/2005 |
| JP | 1980013830 | 1/1980 |
| JP | 1981048533 | 5/1981 |
| JP | 1982106838 | 7/1982 |
| JP | 58187829 | 11/1983 |
| JP | 1983187829 | 11/1983 |
| JP | 60166837 | 8/1985 |
| JP | 1989164219 | 6/1989 |
| JP | 1989189541 | 7/1989 |
| JP | 1992009651 | 1/1992 |
| JP | 1992148836 | 5/1992 |
| JP | 2886323 | 6/1992 |
| JP | 1992168335 | 6/1992 |
| JP | 1992242193 | 8/1992 |
| JP | 1995280695 | 10/1995 |
| JP | 1995293800 | 11/1995 |
| JP | 1998288430 | 10/1998 |
| JP | 1999064153 | 3/1999 |
| JP | 1999094688 | 4/1999 |
| JP | 2000089042 | 3/2000 |
| JP | 3477430 | 12/2001 |
| JP | 3684336 | 4/2002 |
| JP | 2002296141 | 10/2002 |
| JP | 2003161664 | 6/2003 |
| JP | 2004045218 | 2/2004 |
| JP | 2006145459 | 6/2006 |
| JP | 4469939 | 2/2007 |
| JP | 2010113302 | 5/2010 |
| KR | 100803377 | 2/2008 |
| KR | 100908137 | 7/2009 |
| KR | 100913536 | 8/2009 |
| KR | 100947246 | 3/2010 |
| WO | 9626425 | 8/1996 |
| WO | 9843060 | 10/1998 |
| WO | 0136120 | 5/2001 |
| WO | 2004017037 | 2/2004 |
| WO | 2006038788 | 4/2006 |
| WO | 2007108095 | 9/2007 |
| WO | 2009021023 | 2/2009 |
| WO | 2010002951 | 1/2010 |
| WO | 2010010384 | 1/2010 |
| WO | 2010028387 | 3/2010 |
| WO | 2010034986 | 4/2010 |
| WO | 2010034988 | 4/2010 |
| WO | 2010051553 | 5/2010 |
| WO | 2010072293 | 7/2010 |
| WO | 2010093920 | 8/2010 |
| WO | 2010100522 | 9/2010 |
| WO | 2010106110 | 9/2010 |

\* cited by examiner

LEAK DETECTION SYSTEM

FIELD OF INVENTION

The present application relates to the field of fluid lines and fluid line fittings. In particular, the present application relates to a leak detection system for a fluid line.

BACKGROUND

Fluid lines are known to leak at various location. Leaks may be caused, for example, by ordinary wear, temperature fluctuations, weathering, corrosion from the fluid being transported, and other internal and external degenerative factors. In particular, fluid lines may be prone to leakage at a location where a hose meets a fitting.

Certain leak detection systems are known. One known leak detection system includes a strain-sensing layer that detects strain in a hose. Another known leak detection system employs electrical leads.

SUMMARY OF THE INVENTION

In one embodiment a fluid line includes a conduit, a nipple received coaxially within an end of the conduit, a socket disposed coaxially about the conduit and the nipple, and a ring disposed coaxially about the nipple. The ring has at least one slot formed therein, defining a first slot wall and a second slot wall opposite the first slot wall. The ring further has a receiver disposed on at least one of the first and second slot walls.

In another embodiment, a hose leakage detection system includes a ring configured to be disposed within a hose. The ring has a lateral slot formed in an outer surface, defining a first slot wall and a second slot wall. A light receiver is disposed on one of the first slot wall and the second slot wall and a power source is electrically connected to the leakage detection system.

In yet another embodiment, a leak detection apparatus includes a ring having at least one lateral slot formed in an outer surface, each slot defining a first slot wall and a second slot wall. The apparatus also includes a light source and an optical fiber disposed within the ring in a circumferential direction. The optical fiber has a first end connected to the light source and a second end disposed on one of the first and second slot walls of the at least one lateral slot, thereby transmitting light across the at least one lateral slot. At least one optic fiber light receiver is circuit disposed on one of the first and second slot walls of the at least one lateral slot in a location opposite the second end of the optical fiber such that it receives the light transmitted across the at least one lateral slot.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
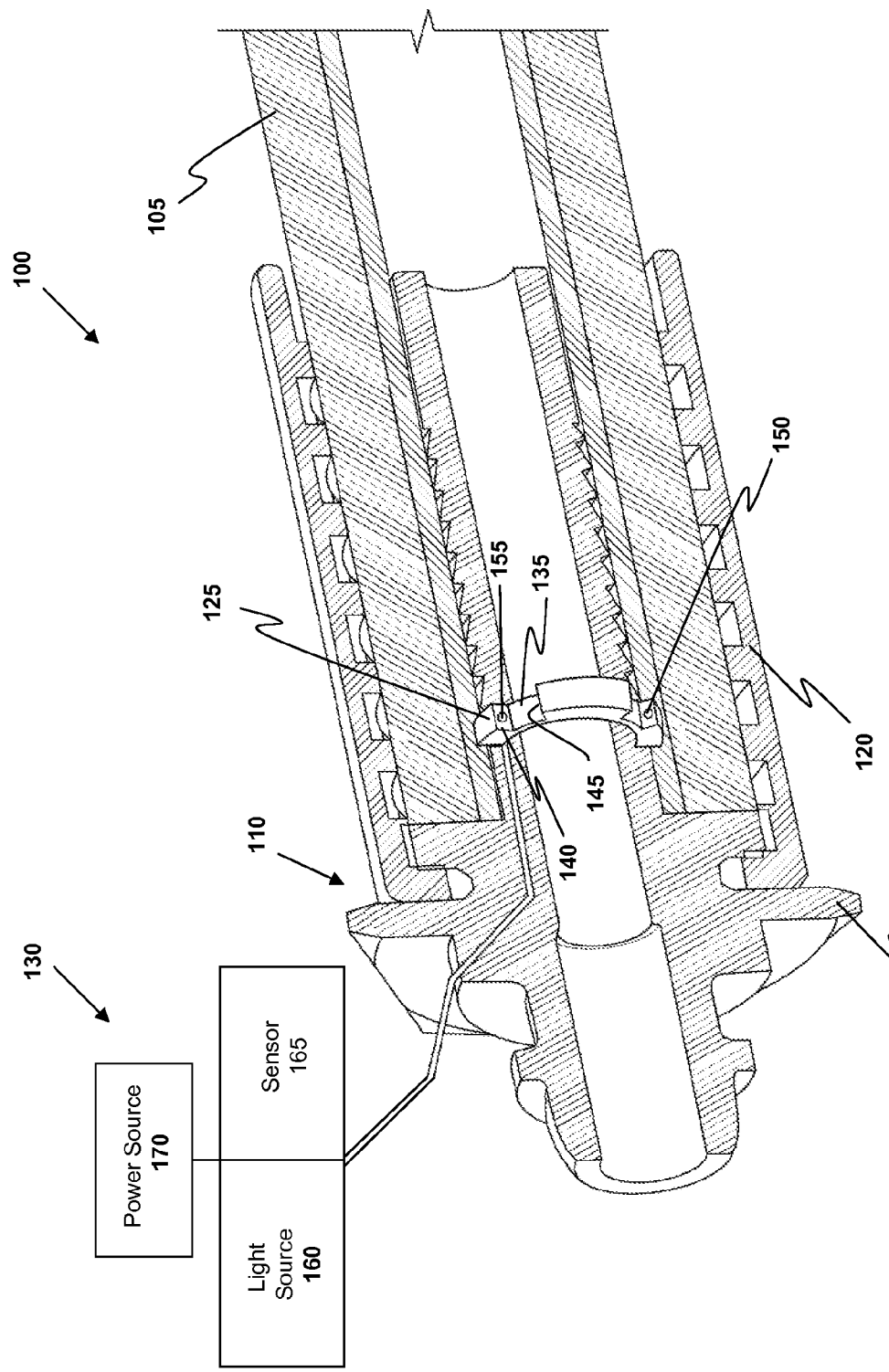
FIG. 1 is a perspective view of an exemplary fluid line having a leak detection system.

FIG. 1 is a perspective view of an exemplary fluid line 100 having a leak detection system. The fluid line 100 includes a hose 105 and a fitting 110. The fitting 110 includes a nipple 115 and a socket 120. The nipple 115 is received coaxially within an end of the hose 110, and the socket 120 is disposed coaxially about the hose 110 and the nipple 115. However, it should be understood that any fitting may be employed, such as a compression fitting or a push to connect fitting. Likewise, the leak detection system may be employed on any conduit conveying fluid and is not limited to use with hoses or flexible tubing.

The leak detection system includes a ring 125 connected to electronics 130. The ring 125 may be dimensioned for any size fluid line. In one known embodiment, the ring 125 has a diameter of between 0.25 inches (0.6 cm) and 5 inches (12.7 cm).

The ring 125 includes at least one slot 135 that defines a first slot wall 140 and a second slot wall 145 opposite the first wall. The width of the slot is proportional to the size of the ring and can be varied to increase the intensity of light received at the receiver end. In the illustrated embodiment, the slot 135 is disposed in the external circumferential surface of the ring 125 and extends in a lateral direction. In other words, the slot 135 extends in a direction parallel to the direction of fluid flow in the hose 105. In an alternative embodiment (not shown), the slot is disposed on an internal circumferential surface of the ring. In another alternative embodiment (not shown), the slot may extend at an acute angle with respect to the lateral direction of the ring 125. Additionally, while the first slot wall 140 is shown as substantially parallel to the second slot wall 145, it should be understood that the slot walls may converge or diverge. Further, the slot walls may be curved or have one or more bends.

In the illustrated embodiment, the ring 125 is disposed about the nipple 115 inside the hose 105. If there is an inadequate seal between the nipple 115 and hose 105, fluid may leak out of the fitting 110 by flowing along the external surface of the nipple 115. The ring 125 is therefore positioned in the path of any fluid that leaks between the nipple 115 and the hose 105. The external circumferential surface of the ring 125 may form a seal with the hose 105, such that leaking fluid would pass through the slot 135. A receiver 150 is disposed on one of the first and second slot walls 140, 145 that can be used to detect the leaking fluid that passes through the slot 135.

Alternatively, the ring may be disposed about the hose inside of the socket. In such an embodiment, the ring is positioned in the path of any fluid that leaks between the hose and the socket. The external circumferential surface of the ring may form a seal with the socket, such that leaking fluid would pass through the slot in the ring.

Figures 2, 3:
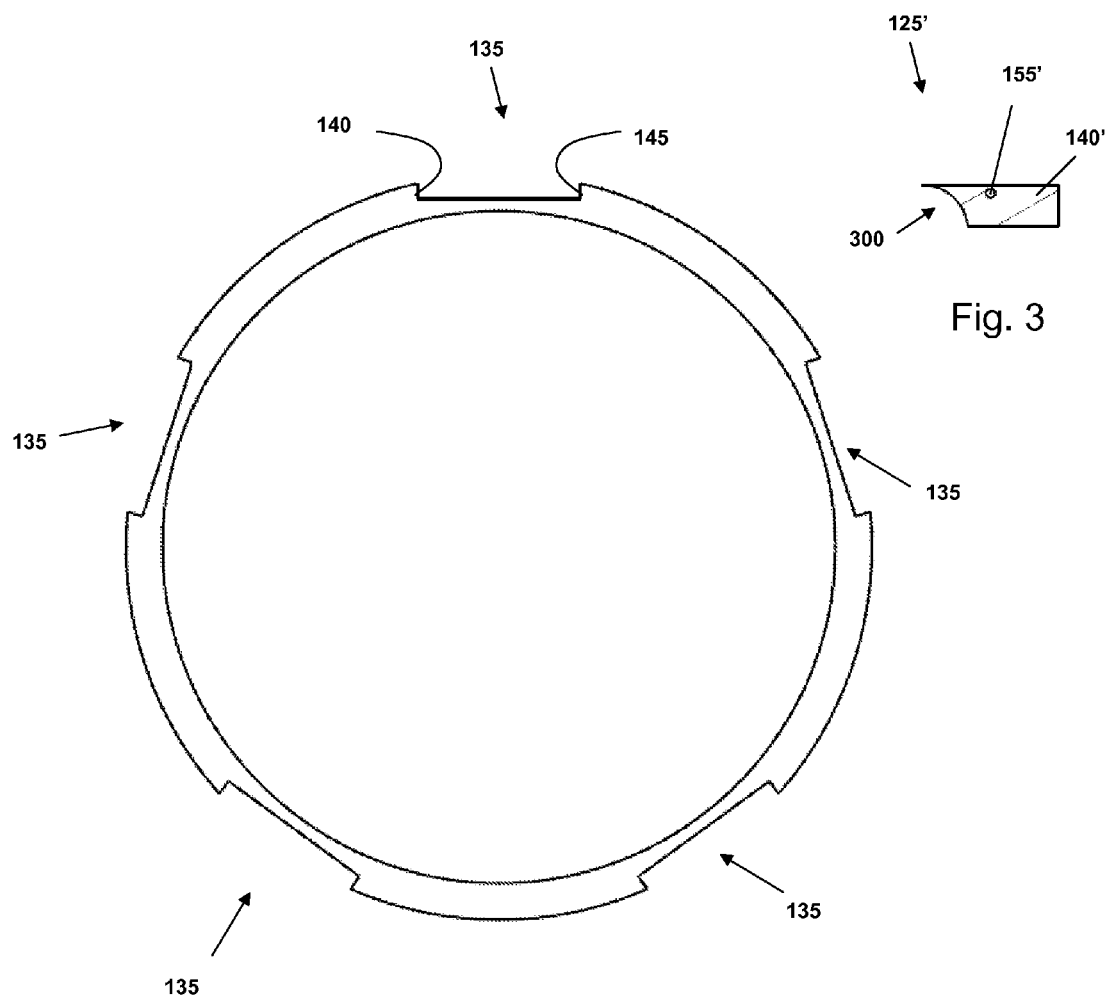
FIG. 2 is a front view of a ring in the leak detection system.
FIG. 3 is a partial cross-section of an alternative embodiment of a ring in the leak detection system.

To increase the likelihood that leaking fluid passes through the slot 135, a plurality of slots 135 may be disposed about the ring 125. FIG. 2 illustrates a front view of the ring 125. In this embodiment, the ring 125 includes five slots 135. In alternative embodiments (not shown), any number of slots may be employed.

The ring 125 may be an O-ring and have sealing properties. The ring 125 may be constructed of metal or a polymeric material. Exemplary construction materials include, without limitation, polytetrafluoroethylene (PTFE), ethylene propylene diene monomer (EPDM) rubber, nitrile rubber, a thermoplastic elastomer such as HYTREL, stainless steel, aluminum, and titanium.

In one embodiment (as shown in FIG. 1), the ring 125 has a substantially flat profile. Alternatively, the ring may have a tapered or a concave profile. For example, FIG. 3 illustrates a partial cross-section of an alternative embodiment of a ring 125' having a curved taper 300. In another example (not shown), the ring may have a straight taper. A tapered ring may be positioned such that it tapers towards the end of the hose. Alternatively, the tapered ring may be positioned such that it tapers away from the end of the hose.

With continued reference to FIGS. 1-3, the ring 125 includes one or more optical fibers 155 (i.e., one or more fiber optic cables) disposed therein. The optical fiber 155 is connected to a light source 160, such as a light emitting diode (LED), laser diode, infrared diode, or other light source. The optical fiber 155 may be directly connected to the light source 160 or indirectly connected (e.g., through one or more additional optical fibers).

An end of the optical fiber 155 is disposed on one of the first and second slot walls 140, 145 such that light travels from the light source 160, through the optical fiber 155 to one of the slot walls 140, 145. The light is then transmitted across the slot 135 to the opposite slot wall 140, 145. In the illustrated embodiment, the end of the optical fiber 155 is disposed on the first slot wall 140 and the receiver 150 is disposed on the second slot wall 145. In this embodiment, the receiver 150 is an optic fiber light receiver 150. The optic fiber light receiver 150 is positioned such that it is ordinarily in the travel path of the light transmitted by the end of the optical fiber 155.

If leaking fluid flows through the slot 135, it blocks the light being transmitted by the end of the optical fiber 155 and prevents some or all of the light from reaching the optic fiber light receiver 150. When light is partially or fully blocked or deflected from reaching the optic fiber light receiver 150, a leak detection sensor 165 that is placed in a location outside the fluid conveying zone raises an alarm. Exemplary sensors include photodiodes, photovoltaic cells, photo resistors, infrared receivers and other light receptor circuits. The alarm may be an audio and/or visual alarm. The alarm may include a local indicator. The alarm may also be transmitted to a remote station, such as a computer, a mobile phone, or other station. Such transmission may be a wired transmission or a wireless transmission.

The leak detection system raises an alarm when the light received by the optic fiber light receiver 150 falls below a selected threshold. An appropriate threshold may be selected such that normal fluctuations in light transmission would not cause an alarm to be raised. An algorithm may also be employed to determine when the light pattern deviates from its normal conditions. The algorithm may be embedded as a part of the leak detection sensor 165.

In the illustrated embodiment, the light source (also called the light transmitter) 160 and the leak detection sensor 165 are external to the fluid line 100. A power source 170 is also external to the fluid line. Together, the light transmitter 160, the leak detection sensor 165, and the power source 170 are designated as electronics 130 in FIG. 1. The electronics 130 may also include logic, such as a microprocessor, a display for displaying an alarm, an audible alarm, and another transmitter for remotely transmitting an alarm. In one embodiment, the electronics 130 may be mounted to one or more of the hose 105, the nipple 115, and the socket 120. In an alternative embodiment, the electronics may be spaced apart from the fluid line 100. While the electronics 130 are schematically designated by a box in FIG. 1, it should be understood that the electronics 130 need not be contained in a housing and different components may be in different locations.

Positioning the electronics 130 external to the fluid line will prevent the fluid being conveyed from damaging the electronics 130. Further, if a combustible fluid is being conveyed, positioning the electronics 130 externally would reduce the chance of a spark causing a combustion. However, there are also advantages to employing internal electronics, such as a smaller footprint, and limiting exposure of the electronics to external elements. Therefore, in an alternative embodiment (not shown), the electronics may be housed inside the fitting.

The power source 170 includes an optical driver circuit that drives the light source 160. In one embodiment, the power source 170 also drives the leak detection sensor 165. Exemplary power sources include batteries. In an alternative embodiment, the transmitter light source 160 and the leak detection sensor 165 is not driven by the power source 170. Instead, it uses energy harvesting devices that derive power parasitically. An energy harvesting device is a parasitic power source that may employ external disturbances, such as vibration, fluid pressure, flow velocity, fluid or ambient temperature, or electro magnetic radiation to generate power. Alternatively, the leak detection system may not include a power source, but instead include an AC power plug configured to draw power from an electrical outlet.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A hose leakage detection system comprising:
   a ring configured to be disposed within a hose, the ring having a lateral slot formed in an outer surface, defining a first slot wall and a second slot wall;
   a light receiver disposed on one of the first slot wall or the second slot wall;
   a power source;
   an optical fiber disposed in the ring and a light emitting diode associated with the optical fiber, wherein the optical fiber emits light from a first slot wall and the light receiver is disposed on the second slot wall; and a leak detection sensor in electronic communication with the light receiver.

2. The system of claim 1, wherein the ring has a plurality of lateral slots formed therein, each of the plurality of lateral slots being associated with a light receiver.

3. The system of claim 1, wherein the ring is constructed of a material selected from the group consisting of polytetrafluoroethylene, ethylene propylene diene monomer rubber, nitrile rubber, a thermoplastic elastomer, stainless steel, aluminum, and titanium.

4. The system of claim 1, wherein the power source is a parasitic power generator.

5. The system of claim 1, wherein the ring is configured to be disposed on a fitting.

6. A leak detection apparatus comprising:
   a ring having at least one lateral slot formed in an outer surface, each slot defining a first slot wall and a second slot wall;
   a light source;
   an optical fiber disposed within the ring in a circumferential direction, the optical fiber having a first end connected to the light source and a second end disposed on one of the first or second slot walls of the at least one lateral slot, thereby transmitting light across the at least one lateral slot; and
   at least one optic fiber light receiver disposed on one of the first or second slot walls of the at least one lateral slot in a location opposite the second end of the optical fiber such that it receives the light transmitted across the at least one lateral slot.

7. The apparatus of claim 6, wherein the light source is a light emitting diode.

8. The apparatus of claim 6, wherein the ring has tapered profile.

9. The apparatus of claim 8, wherein tapered profile includes a concave surface.

10. The device of claim 6, further comprising a power source.

* * * * *